United States Patent
Yin et al.

(10) Patent No.: US 11,452,003 B1
(45) Date of Patent: Sep. 20, 2022

(54) COMPATIBLE PACKET SEPARATION FOR COMMUNICATION NETWORKS

(71) Applicant: The Chinese University of Hong Kong, Shatin (CN)

(72) Inventors: Ho Fai Hoover Yin, Tin Shui Wai (CN); Ka Hei Ng, Kowloon (CN); Zhuowei Zhong, Yunfu (CN); Raymond Wai Ho Yeung, Shatin (CN); Shenghao Yang, Shenzhen (CN)

(73) Assignee: The Chinese University of Hong Kong, Shatin (CN)

( * ) Notice: Subject to any disclaimer, the term of this patent is extended or adjusted under 35 U.S.C. 154(b) by 0 days.

(21) Appl. No.: 17/220,714

(22) Filed: Apr. 1, 2021

(51) Int. Cl.
H04W 28/04 (2009.01)
H04L 49/552 (2022.01)

(52) U.S. Cl.
CPC ........... *H04W 28/04* (2013.01); *H04L 49/552* (2013.01)

(58) Field of Classification Search
None
See application file for complete search history.

(56) References Cited

U.S. PATENT DOCUMENTS

| 10,425,192 | B2 | 9/2019 | Yin et al. | |
| 2016/0182090 | A1* | 6/2016 | Shim | H03M 13/2789 714/774 |
| 2017/0093666 | A1* | 3/2017 | Yin | H04L 1/0076 |

OTHER PUBLICATIONS

Yang, et al., "BATS: Network coding in action," Fifty-second Annual Allerton Conference Allerton House, UIUC, Illinois, USA, pp. 1204-1211 (2014).
Yin, et al., "Adaptive recoding for BATS codes," IEEE International Symposium on Information Theory (ISIT), Barcelona, Spain, pp. 2349-2353 (2016).
Yin, et al., "A Unified Adaptive Recoding Framework for Batched Network Coding," IEEE International Symposium on Information Theory (ISIT), pp. 1962-1966 (2019).
Yin, et al., "A Protocol Design Paradigm for Batched Sparse Codes," Entropy, vol. 22(7):790, 57 pages (2020).
Zhang, et al., "FUN Coding: Design and Analysis" IEEE/ACM Transactions on Networking, vol. 24, No. 06, pp. 3340-3353 (2016).

\* cited by examiner

*Primary Examiner* — Anh Ngoc M Nguyen
(74) *Attorney, Agent, or Firm* — Kilpatrick Townsend & Stockton LLP

(57) ABSTRACT

Described herein are systems, methods, and other techniques for compatible packet separation for communication networks. A block comprising a plurality of packets to be transmitted over a network is received. The block includes a set of batches, and the plurality of packets are distributed between the set of batches. A pseudo interleaver depth is calculated for each of the set of batches to produce a set of pseudo interleaver depths. Blockwise adaptive recoding is performed using the set of pseudo interleaver depths to produce a number of recoded packets for each of the set of batches. A transmission sequence is generated using the number of recoded packets for each of the set of batches.

20 Claims, 11 Drawing Sheets

Transmission Sequence Approximation

Data: $\{t_i\}_{i=1}^L$ where $t_1 \geq t_2 \geq \ldots \geq t_L$, $\sum_{i=1}^L t_i = T$.
Result: A transmission sequence.

1  $\ell \leftarrow 1; r \leftarrow T; i \leftarrow 1; f \leftarrow$ an array of $T$ integers ;
2  while $i \leq L$ do
3    if $t_i > 1$ then
4      bundle $\leftarrow \max\{j : t_j == t_i\} - i + 1$ ;
5      gap $\leftarrow ((r - \ell + 1) - \text{bundle})/(t_i - 1)$ ;
6      for $t = 1, 2, \ldots, t_i$ do
7        pos $\leftarrow \emptyset$ ;
8        for $j = i, i+1, \ldots, i + \text{bundle} - 1$ do
9          tmp $\leftarrow$ slip$(\ell + (j - i) + (t - 1)\text{gap})$ ;
10         pos $\leftarrow$ pos $\cup \{\text{tmp}\}$ ;
11         Mark $f[\text{tmp}]$ as assigned ;
12       for $j = i, i+1, \ldots, i + \text{bundle} - 1$ do
13         $f[\min \text{pos}] \leftarrow j$ ;
14         pos $\leftarrow$ pos $\setminus \{\min \text{pos}\}$ ;
15     $i \leftarrow i + \text{bundle}$ ;
16   else
17     $f[\ell] \leftarrow i; \ell \leftarrow i + 1$ ;
18     $\ell \leftarrow$ the leftmost unassigned index of $f$ ;
19     $r \leftarrow$ the rightmost unassigned index of $f$ ;
20 return $f$ ;

FIG. 6

Algorithm 600

COMPATIBLE PACKET SEPARATION FOR COMMUNICATION NETWORKS

BACKGROUND OF THE INVENTION

Multi-hop wireless networks are becoming popular in smart city applications in the era. of Internet-of-Things. Unlike wired links, wireless links may not be reliable as they are easily interfered with by other wireless signals and environmental factors. Packet loss, especially burst loss, is a common phenomenon on a wireless link. Traditional networking approaches based on forwarding and end-to-end retransmission may not perform well in multi-hop wireless networks because a packet can reach its destination only if it is transmitted successfully on all the links, whose probability diminishes exponentially fast with the number of hops.

As such, new systems, methods, and other techniques for improving the reliability of wireless networks are needed.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: receiving a block comprising a plurality of packets to be transmitted over a network, wherein the block includes a set of batches, and wherein the plurality of packets are distributed between the set of batches; calculating a pseudo interleaver depth for each of the set of batches to produce a set of pseudo interleaver depths; performing blockwise adaptive recoding using the set of pseudo interleaver depths to produce a number of recoded packets for each of the set of batches; and generating a transmission sequence using the number of recoded packets for each of the set of batches.

Example 2 is the computer-implemented method of example(s) 1, further comprising: interleaving the plurality of packets using the transmission sequence.

Example 3 is the computer-implemented method of example(s) 1-2, further comprising: outputting the transmission sequence.

Example 4 is the computer-implemented method of example(s) 1-3, further comprising: calculating a dispersion efficiency for the transmission sequence; and determining whether the dispersion efficiency is a largest dispersion efficiency.

Example 5 is the computer-implemented method of example(s) 1-4, wherein performing the blockwise adaptive recoding using the set of pseudo interleaver depths includes: calculating a channel model for each of the set of batches.

Example 6 is the computer-implemented method of example(s) 5, wherein performing the blockwise adaptive recoding using the set of pseudo interleaver depths further includes: solving a blockwise adaptive recoding optimization problem using the channel model for each of the set of batches.

Example 7 is the computer-implemented method of example(s) 1-6, wherein the pseudo interleaver depth for a particular batch of the set of batches is calculated based on an average separation between consecutive packets of the particular batch.

Example 8 is a non-transitory computer-readable medium comprising instructions that, when executed by one or more processors, cause the one or more processors to perform operations comprising: receiving a block comprising a plurality of packets to be transmitted over a network, wherein the block includes a set of batches, and wherein the plurality of packets are distributed between the set of batches; calculating a pseudo interleaver depth for each of the set of batches to produce a set of pseudo interleaver depths; performing blockwise adaptive recoding using the set of pseudo interleaver depths to produce a number of recoded packets for each of the set of batches; and generating a transmission sequence using the number of recoded packets for each of the set of batches.

Example 9 is the non-transitory computer-readable medium of example(s) 8, wherein the operations further comprise: interleaving the plurality of packets using the transmission sequence.

Example 10 is the non-transitory computer-readable medium of example(s) 8-9, wherein the operations further comprise: outputting the transmission sequence.

Example 11 is the non-transitory computer-readable medium of example(s) 8-10, wherein the operations further comprise: calculating a dispersion efficiency for the transmission sequence; and determining whether the dispersion efficiency is a largest dispersion efficiency.

Example 12 is the non-transitory computer-readable medium of example(s) 8-11, wherein performing the blockwise adaptive recoding using the set of pseudo interleaver depths includes: calculating a channel model for each of the set of batches.

Example 13 is the non-transitory computer-readable medium of example(s) 12, wherein performing the blockwise adaptive recoding using the set of pseudo interleaver depths further includes: solving a blockwise adaptive recoding optimization problem using the channel model for each of the set of batches Example 14 is the non-transitory computer-readable medium of example(s) 8-13, wherein the pseudo interleaver depth for a particular batch of the set of batches is calculated based on an average separation between consecutive packets of the particular batch.

Example 15 is a system comprising: one or more processors; and a computer-readable medium comprising instructions that, when executed by the one or more processors, cause the one or more processors to perform operations comprising: receiving a block comprising a plurality of packets to be transmitted over a network, wherein the block includes a set of batches, and wherein the plurality of packets are distributed between the set of batches; calculating a pseudo interleaver depth for each of the set of batches to produce a set of pseudo interleaver depths; performing blockwise adaptive recoding using the set of pseudo interleaver depths to produce a number of recoded packets for each of the set of batches; and generating a transmission sequence using the number of recoded packets for each of the set of batches.

Example 16 is the system of example(s) 15, wherein the operations further comprise: interleaving the plurality of packets using the transmission sequence.

Example 17 is the system of examples) 15-16, wherein the operations further comprise: outputting the transmission sequence.

Example 18 is the system of example(s) 15-17, wherein the operations further comprise: calculating a dispersion efficiency for the transmission sequence; and determining whether the dispersion efficiency is a largest dispersion efficiency.

Example 19 is the system of example(s) 15-18, wherein performing the blockwise adaptive recoding using the set of pseudo interleaver depths includes: calculating a channel model for each of the set of batches.

Example 20 is the system of example(s) 19, wherein performing the blockwise adaptive recoding using the set of pseudo interleaver depths further includes: solving a blockwise adaptive recoding optimization problem using the channel model for each of the set of batches.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 6 illustrates an example algorithm that may be performed by a packet separator to approximate a transmission sequence.

Figure 1:
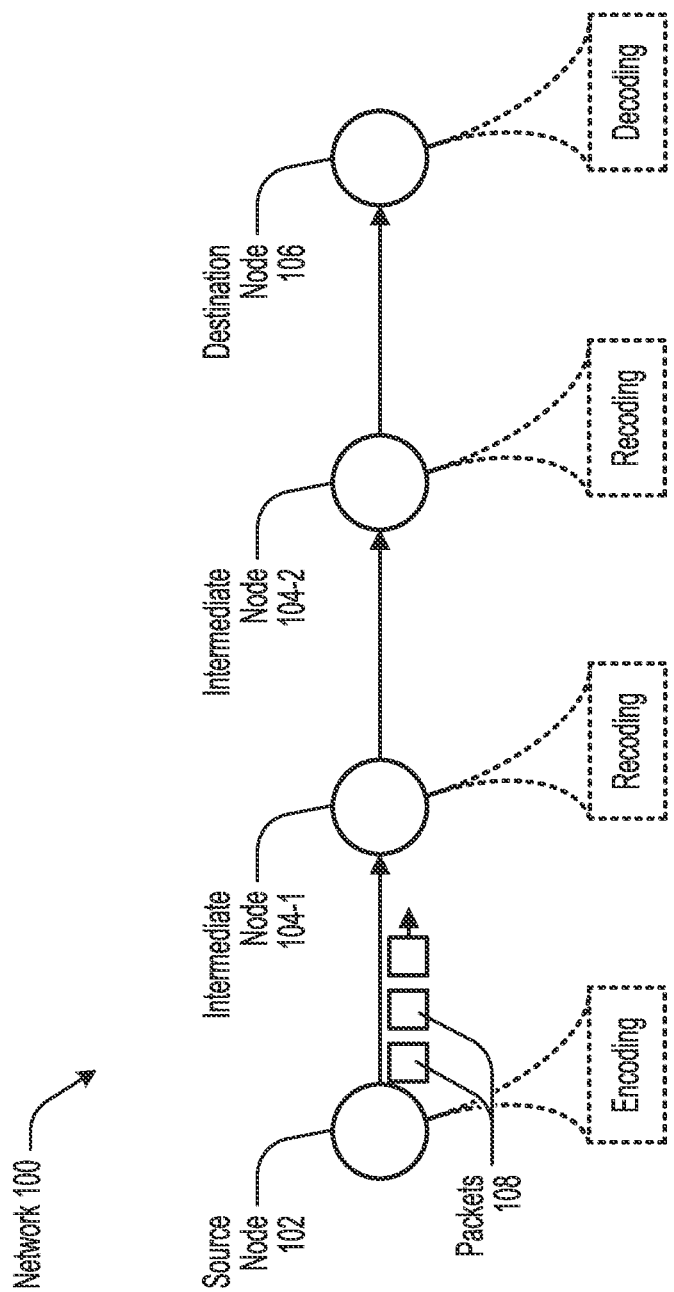
FIG. 1 illustrates an example network including a plurality of nodes.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

The capacity of networks with packet loss for many scenarios can be achieved by using random linear network coding (RLNC). The simplest RLNC scheme is that the source node transmits random linear combinations of the input packets and each intermediate node transmits random linear combinations of the packets it has received. The destination node can decode the input packets once it has received enough coded packets with linearly independent coding vectors. The network code itself plays the role of an end-to-end erasure correction code, However, some complexity issues need to be considered when implementing this RLNC scheme for real systems, including (1) the computational cost of encoding and decoding, (2) the storage and computational cost at the intermediate nodes, and (3) the overhead for transmitting the coefficient vectors.

One way to resolve these issues is to apply network coding to a small subset of the coded packets generated from the input packets. This approach is known as batched network coding (BNC). The encoder of BNC generates batches, where each batch contains a set of coded packets. At each intermediate node, network coding is applied to the packets belonging to the same batch. The network coding operation performed at the intermediate nodes is known as recoding.

In order to distinguish different batches for recoding, a batch ID may be attached to each packet in a protocol for BNC. The design of a minimal protocol for BNC is a fundamental building block of other protocols. In this protocol, an intermediate node starts recoding the packets of the current batch once the node receives a packet of the next batch (with the possibility of skipping batches). The same number of recoded packets are generated for each batch during recoding. This recoding approach is known as baseline recoding.

The application of an interleaver to this protocol may be referred to as the interleaved minimal protocol. One reason for applying an interleaver is that burst packet loss degrades the throughput of BNC. In this interleaved protocol, an intermediate node starts recoding once the node receives a packet of a batch from the next block (with the possibility of skipping blocks), where a block contains a number of batches. Similarly, a block ID can be applied to distinguish different blocks. This ID can be calculated from the batch ID so that the packet design remains unchanged. Although the protocol uses baseline recoding, the protocol still works when a node receives an arbitrary permutation of packets inside a block.

However, baseline recoding may not be optimal in terms of throughput. For example, adaptive recoding, which adaptively decides the number of recoded packets for each batch, can outperform baseline recoding. An advanced protocol that incorporates adaptive recoding, minimizes the transmission delay incurred by the interleaver and interleaves the packets of the batches evenly, has been discussed previously. However, this advanced protocol does not adopt the concept of blocks, making it incompatible with the interleaved minimal protocol. This means that all the deployed devices need to be upgraded in order to use the new protocol. In practice, upgrading all the devices at the same time may not be feasible, and some devices may not o be upgradable. Thus, it may be important to consider the mixed use of protocols.

Some embodiments of the present disclosure may include adopting adaptive recoding block by block and designing an interleaver under the minimal protocol framework. This interleaver may use dynamic interleaver depths for the packets of the batches in a block, i.e., an uneven spread of packets belonging to the same batch may be allowed. The throughput of BNC can be enhanced by this interleaver. As this interleaver only permutates the packets within a block, it is compatible with the minimal protocol, and so it works well with those devices that are not upgradable. This interleaver may be referred to as an intrablock interleaver.

As described above, since the interleaver can work with adaptive recoding under the minimal protocol framework, it is compatible with existing devices that are deployed with the interleaved minimal protocol. In some embodiments, the design may be considered to consist of three components. The first component, referred to as the blockwise adaptive recoder, may apply adaptive recoding with pseudo interleaver depths to decide the number of recoded packets to be generated for each batch in a block. The second component, referred to as the packet separator, may determine the permutation applied to the packets of the current block according to the number of recoded packets given by the first component. The third component, referred to as the decision maker, may select an optimized transmission sequence based on a calculated dispersion efficiency of the permutation, and may further calculate pseudo interleaver depths for subsequent iterations through the three components.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example network 100 including a plurality of nodes, in accordance with some embodiment of the present disclosure. Network 100 is an example of a three-hop network that includes a source node 102, a first intermediate node 104-1, a second intermediate node 104-2, and a destination node 106. FIG. 1 further illustrates a set of example operations performed by the nodes, including an encoding operation performed by source node 102, a first recoding operation performed by intermediate node 104-1, a second recoding operation performed by intermediate node 104-2, and a decoding operation performed by destination node 106. For example, during operation of network 100, source node 102 may encode a plurality of packets 108, intermediate node 104-1 may recode packets 108, intermediate node 104-2 may recode packets 108, and destination node 106 may decode packets 108.

Figure 2A:
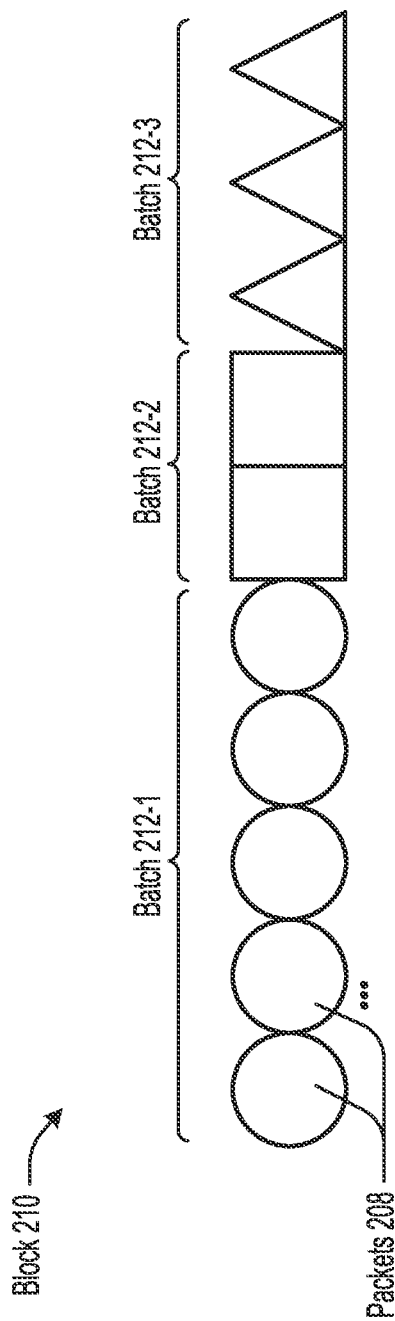
FIGS. 2A and 2B illustrate an example of how an intrablock interleaver can be applied to a block of packets.
Figure 2B:
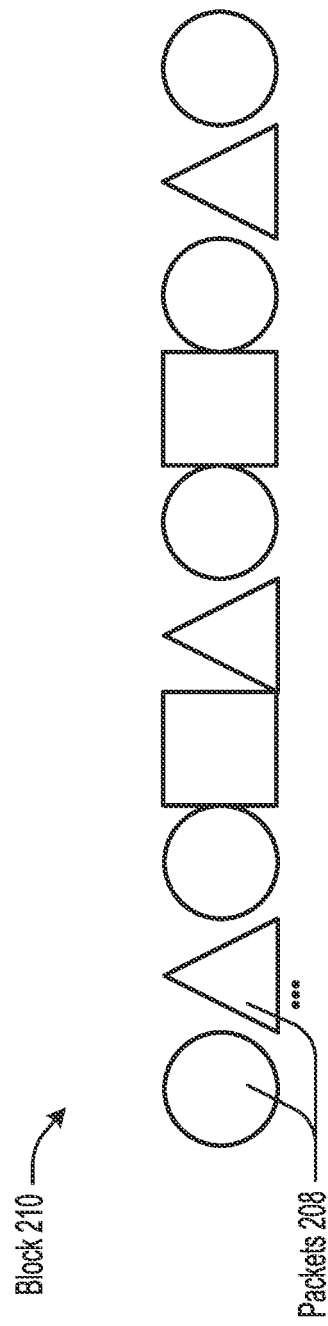

FIGS. 2A and 2B illustrate an example of how an intrablock interleaver can be applied to a block 210 of packets 208, in accordance with some embodiment of the present disclosure. In the illustrated example, block 210 consists of three batches 212, with packets 208 of a first batch 212-1 being represented with circles, packets 208 of a second batch 212-2 being represented with squares, and packets 208 of a third batch 212-3 being represented with triangles. FIG. 2A shows the transmission sequence of packets 208 if there is no interleaving.

FIG. 2B shows the sequence of transmission of packets 208 if an intrablock interleaver is applied. It can be observed that the spread of the packets can be uneven and that the distance between any two consecutive packets of the same batch can be different. As used herein, applying an intrablock interleaver may include permutating a number of packets while restricting within the same block. Applying an intrablock interleaver at a network node may include finding a suitable transmission sequence that gives a specific permutation of the packets.

Figure 3:
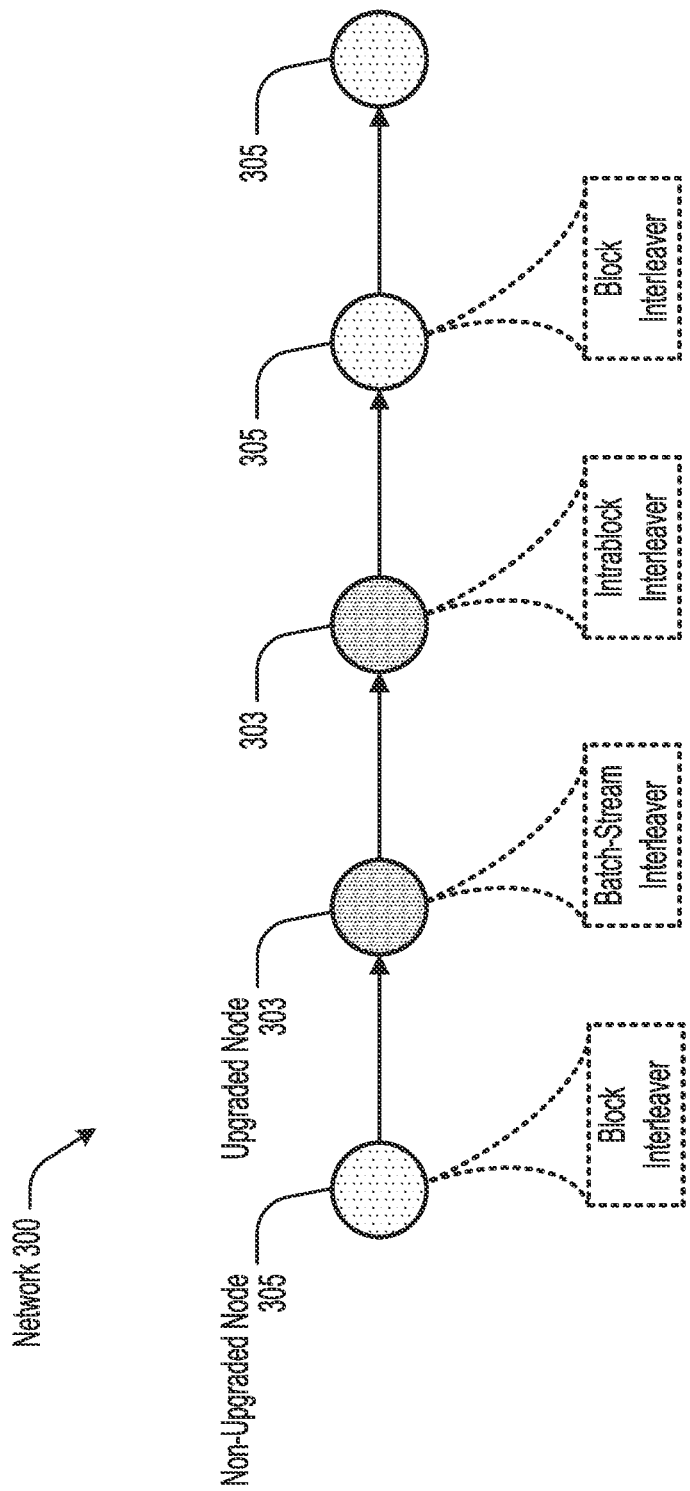
FIG. 3 illustrates an example line network with various combinations of linking upgraded nodes with non-upgraded nodes.

FIG. 3 illustrates an example line network 300 with all four combinations of linking upgraded nodes 303 with non-upgraded nodes 305, in accordance with some embodiment of the present disclosure. In the illustrated example, non-upgraded nodes 305 can only use block interleavers, while upgraded nodes 303 can use batch-stream interleavers or intrablock interleavers. Embodiments of the present disclosure are beneficial in that they allow for such non-upgraded nodes 305 to use intrablock interleavers, as the described techniques are compatible with the interleaved minimal protocol.

Figure 4:
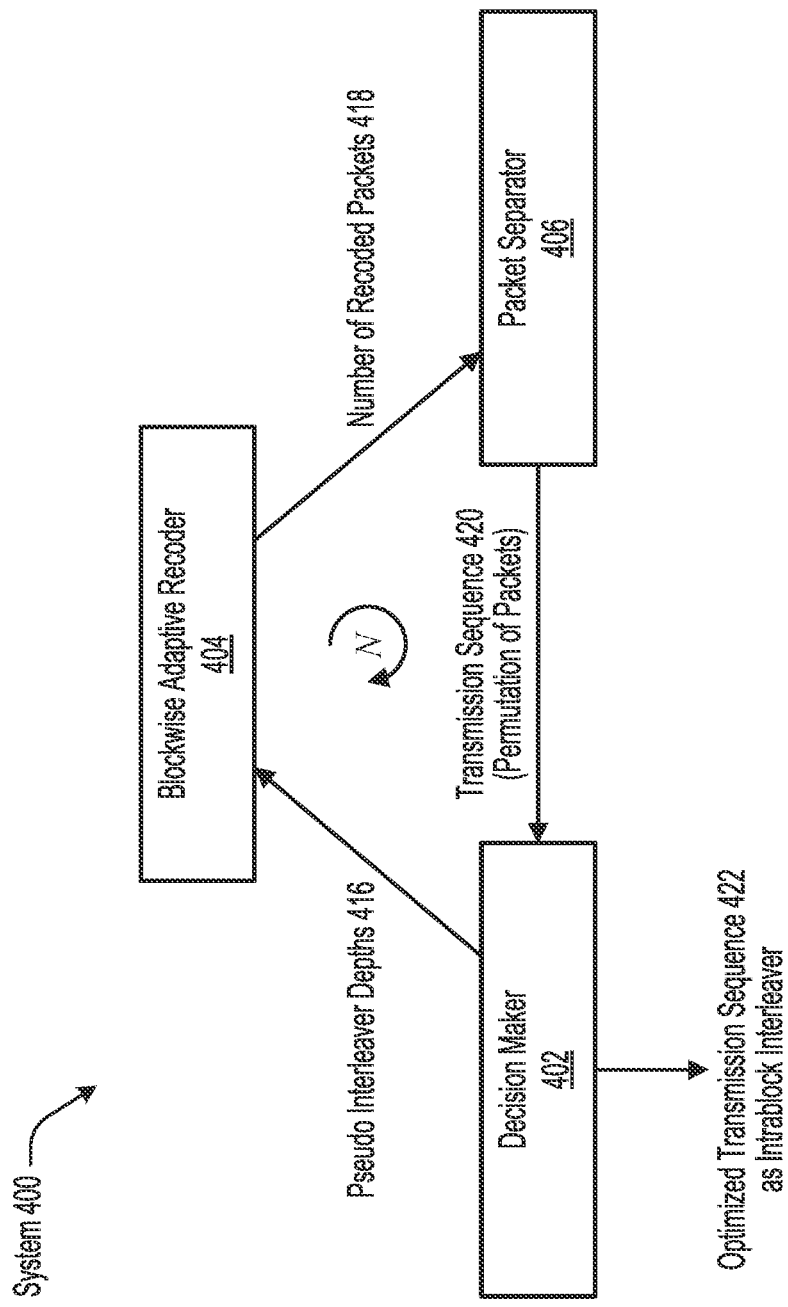
FIG. 4 illustrates an example system for performing blockwise adaptive recoding for an intrablock interleaver.

FIG. 4 illustrates an example system 400 for performing compatible packet separation in a communication network, in accordance with some embodiment of the present disclosure. The illustrated operations and corresponding data may be produced/performed for each received block of packets. In the illustrated example, system 400 includes a decision maker 402 that generates and provides pseudo interleaver depths 416 to a blockwise adaptive recoder 404, which generates and provides a number of recoiled packets 418 to a packet separator 406, which generates and provides a transmission sequence 420 (permutation of packets) to decision maker 402, which also selects and/or generates an optimized transmission sequence 422.

Adaptive recoding is a recoding strategy which aims to enhance the system throughput by optimizing the number of recoded packets based on the ranks of the batches and the channel condition, where the rank of a batch is a measure of the amount of information carried by the batch. In practice, the channel condition can be varying and unpredictable due to random environment changes. One way to obtain the channel condition is to make short-term observations from time to time. In other words, a certain number of batches are grouped into a block and the number of recoded packets of these batches within the block are optimized by adaptive recoding. This approach may be referred to as blockwise adaptive recoding.

After receiving a block of packets, the procedure starts with decision maker 402. Initially, pseudo interleaver depths 416 for the batches are set to 1 and are then passed to blockwise adaptive recoder 404 which performs blockwise adaptive recoding. For each iteration after the first iteration, after receiving transmission sequence 420 from packet separator 406, decision maker 402 calculates the dispersion efficiency of transmission sequence 420 and records transmission sequence 420 if its dispersion efficiency is higher than all of the previously received transmission sequences for the current block. Then, pseudo interleaver depth 416 of this newly received transmission sequence 420 is calculated and passed to blockwise adaptive recoder 404.

In some embodiments, decision maker 402 records the transmission sequence 420 (permutation of packets) provided by packet separator 406 that has the highest dispersion efficiency over N iterations. After N iterations, decision maker 402 breaks the loop and this recorded transmission sequence 420 is outputted as optimized transmission sequence 422. The recoded packets of the batches in the block may then be transmitted in accordance with optimized transmission sequence 422.

in some embodiments, from a permutation of packets of a block, the channel condition observed by each batch is imitated so that the number of recoded packets of the batches in this block can be reoptimized. As used herein, the pseudo interleaver depth of a particular batch may refer to the average separation between consecutive packets of the batch. It may be defined as 1 if there is only one packet in the batch or if it is unknown. This depth, which is not necessarily an integer, represents the idling time before transmitting a packet of the same batch again, i.e., it is an estimation of the channel condition for the batch. It can be calculated from a given permutation of the packets in a block.

The number of recoded packets to be transmitted for each batch in a block can be used to maximize the average expected rank of the batches in a block at the next node. In the calculation of the expected rank of a batch at the next node, the pseudo interleaver depth of that batch is used as the channel condition for the transmission. The constraint of the optimization problem is that the total number of recoded packets to be transmitted for the individual batches equals the number of packets that can be transmitted for this block. This optimization problem is a concave integer programming problem. The mathematical formulation of the problem is $$\max_{t_b \in \{0,1,2,\ldots\}, \forall b \in \mathcal{L}} \sum_{b \in \mathcal{L}} E_b(r_b, t_b)$$

$$\text{s.t.} \sum_{b \in \mathcal{L}} t_b = t_{max}$$

where $\mathcal{L}$ is a block (a set of batches), $r_b$, $t_b$ are the rank and the number of recoded packets of a batch b, respectively, $t_{max}$ is the total number of packets in the block, and $E_b(r_b, t_b)$ is the expected rank of the batch b at the next hop when one uses the pseudo interleaver depth for this batch and transmits $t_b$ recoded packets for this batch.

Due to the discrete nature of the objective function, the problem may not be solved by the commonly used solvers for concave optimizations. The following is a new mathematical formulation for blockwise adaptive recoding. This formulation is a linear programming problem so that it can be solved by optimization solvers:

$$\max_{t_b, e_b \geq 0, \forall b \in \mathcal{L}} \sum_{b \in \mathcal{L}} e_b$$

$$\text{s.t.} \sum_{b \in \mathcal{L}} t_b = t_{max}$$

$e_b \leq E_b(r_b, i) + (E_b(r_b, i+1) - E_b(r_b, i))(t_b - i), \forall b \in \mathcal{L},$
$\forall i \in \{0, 1, \ldots, t_{max}\}$ In some embodiments, blockwise adaptive recoder 404 may perform the following operations for each iteration. First, blockwise adaptive recoder 404 may receive a pseudo interleave depth for each batch in the block. Next, blockwise adaptive recoder 404 may calculate the channel model for each batch and calculate $E_b(r_b, t_b)$. Next, blockwise adaptive recoder 404 may solve the blockwise adaptive recoding optimization problem. Finally, blockwise adaptive recoder 404 may output the number of recoded packets for each batch.

Figure 5:
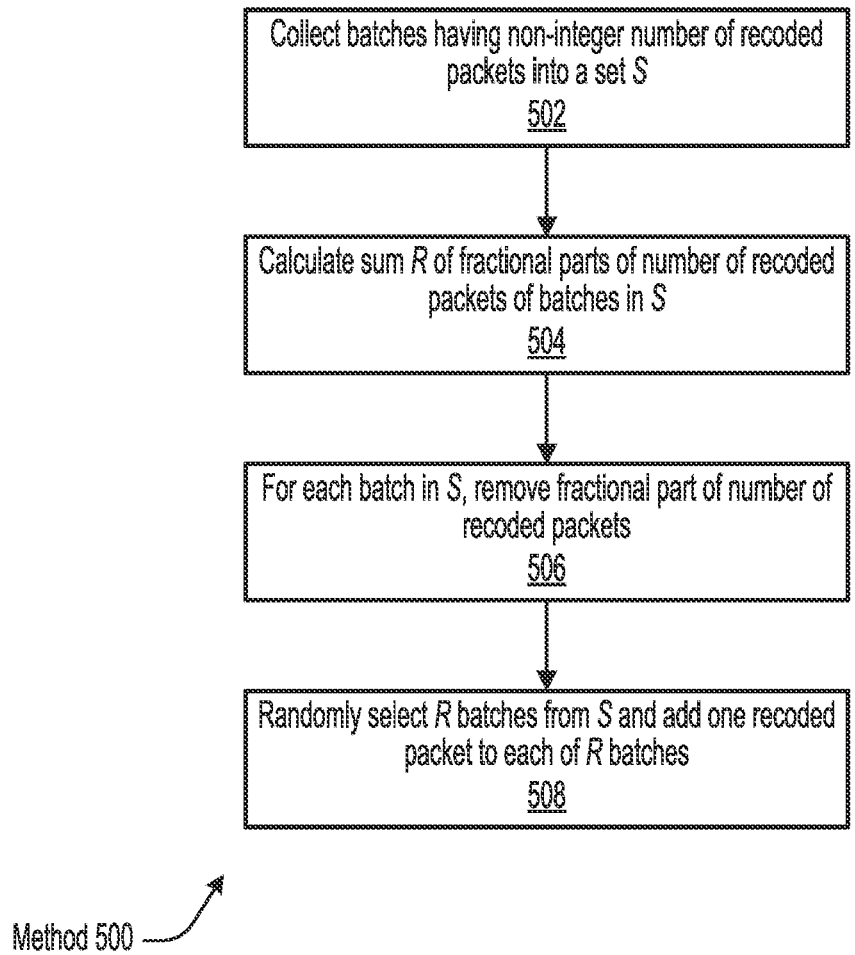
FIG. 5 illustrates an example method that may be performed after solving a linear programming problem.

FIG. 5 illustrates an example method 500 that may be performed after solving the above linear programming problem to ensure that the number of recoded packets $t_b$ is an integer, in accordance with some embodiment of the present disclosure. Method 500 includes, at step 502, collecting the batches having a non-integer number of recoded packets into a set S. Method 500 further includes, at step 504, calculating the sum R of the fractional parts of the number of recoded packets of the batches in S. Method 500 further includes, at step 506, for every batch in S, removing the fractional part of the number of recoded packets. Method 500 further includes, at step 508, randomly selecting R batches from S and adding one recoded packet to each of these batches.

FIG. 6 illustrates an example algorithm 600 to approximate a transmission sequence, in accordance with some embodiment of the present disclosure. Given the number of recoded packets to be transmitted for each batch in a block, it is aimed to find a permutation of the packets so that each pair of consecutive packets in the batch is separated as much as possible. The dispersion efficiency is a score for the goodness of separation of the packets in a permutation. The goal is to find a permutation which gives a high dispersion efficiency.

There can be different formulations of the dispersion efficiency. For example, it can be the sum of the separation scores of all the consecutive pairs of packets in the batch, or the sum of the separation scores of all the pairs of packets in the batch. The separation score is a measure of the separation between two packets in the permutation. Some examples of the formulation of the separation score include the negative reciprocal of the separation between the packets or the logarithm of the separation between the packets.

The problem to find the optimal permutation is a combinatorial optimization problem. A close-to-optimal permutation can be approximated efficiently in two stages. Let L be the number of batches in the block and let $t_i$ be the number of recoded packets to be transmitted for the i-th batch. Without loss of generality, the batches may be sorted by $t_i$ in descending order, resulting in $t_1 \geq t_2 \geq \ldots \geq t_L$. T is the number of packets in the block. The first stage is to run algorithm 600, which gives an approximation of the permutation. The permutation is called a transmission sequence in the algorithm.

In the algorithm, the slip function is defined by $$\text{slip}(x) = \begin{cases} \underline{x}, & \text{if } \overline{x} = \bot \text{ or } (\underline{x} \neq \bot \text{ and } x - \underline{x} \leq \overline{x} - x) \\ \overline{x}, & \text{otherwise} \end{cases}$$

where $$\underline{x} = \begin{cases} \max\{k \leq \lfloor x \rfloor : \text{position } k \text{ is unassigned}\}, & \text{if exists} \\ \bot, & \text{otherwise} \end{cases}$$

$$\overline{x} = \begin{cases} \min\{k \geq \lceil x \rceil : \text{position } k \text{ is unassigned}\}, & \text{if exists} \\ \bot, & \text{otherwise} \end{cases}$$

The idea of the algorithm is that, for a batch which has the largest number of recoded packets, the distance between the packets should be the smallest. In order to spread these packets as far as possible, the first and the last indices of a transmission sequence are allocated.

The algorithm collects the batches which send the same number of recoded packets as a bundle. In each bundle, the batches in it have the same priority so that the separation of packets is not biased. The variable gap gives the target interleaver depth for the batch (for evenly spreading the packets), but this gap can be a non-integer number. If the target index is calculated by the variable gap, a non-integer index may be obtained, or an index assigned to other batches.

The slip function is to find the closest unassigned index from the target index. These slipped indices for a bundle are collected as a set variable pos and then the batches are assigned to the indices stated in pos in a sequential order.

Figure 7:
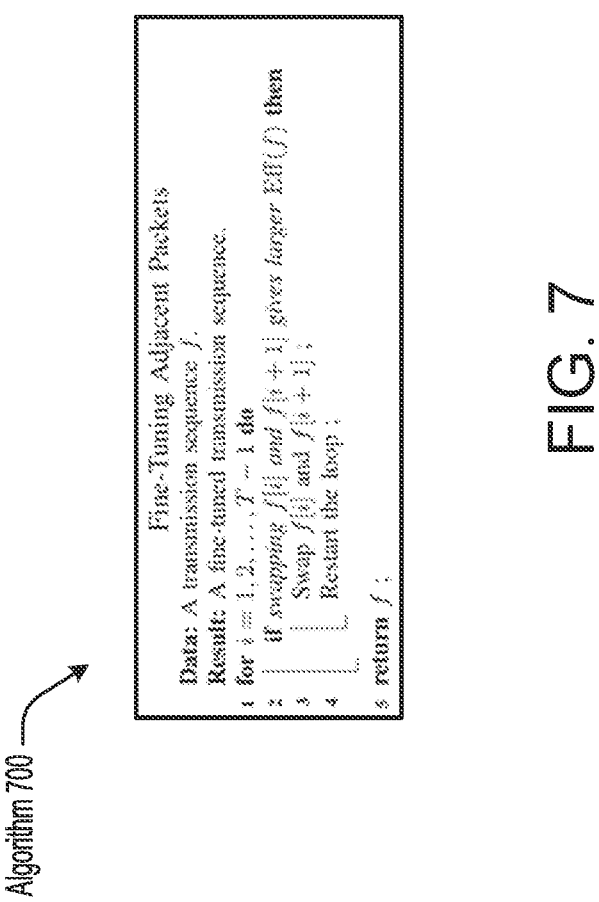
FIG. 7 illustrates an example algorithm that may be performed to fine-tune a permutation.

FIG. 7 illustrates an example algorithm 700 that may optionally be performed to further fine-tune the permutation given by algorithm 600 in order to achieve a better dispersion efficiency, where Eff(f) is the dispersion efficiency of the permutation f, in accordance with some embodiment of the present disclosure. In some embodiments, algorithm 700 is considered a fine-tuning algorithm. After running algorithm 700, the permutation is close to optimal. It can be used as an initial configuration for other combinatorial search algorithms like simulated annealing to further enhance the separation, but this extra fine-tuning step is again optional. The permutation that is obtained by the above stages can then be used as an interleaver for the packets in the block.

Figure 8:
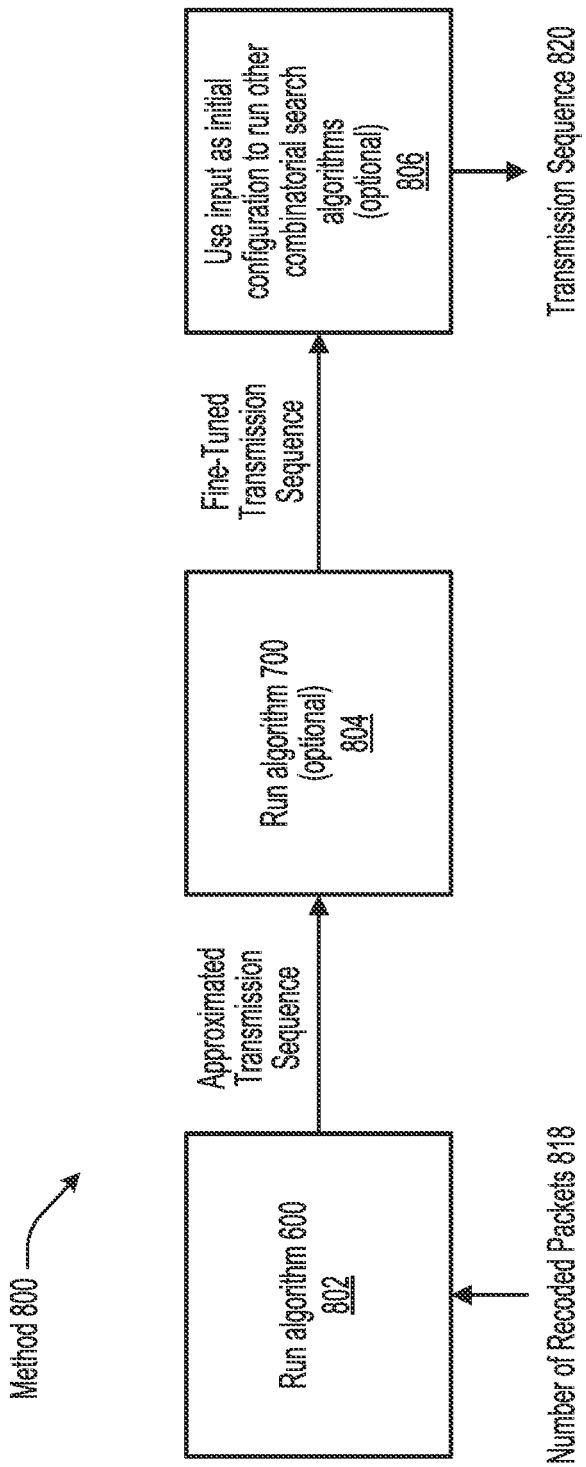
FIG. 8 illustrates an example method that may be performed by a packet separator.

FIG. 8 illustrates an example method 800 that may be performed by a packet separator (e.g., packet separator 406) in conjunction with algorithms 600 and 700, in accordance with some embodiment of the present disclosure. At step 802, a number of recoded packets 818 per batch is received and algorithm 600 is run to generate an approximated transmission sequence. At step 804, the approximated transmission sequence is received and algorithm 700 is run to generate a fine-tuned transmission sequence. At step 806, the input (approximated transmission sequence or fine-tuned transmission sequence if step 804 is performed) is used as an initial configuration to run other combinatorial search algorithms, and a transmission sequence 820 is outputted.

Figure 9:
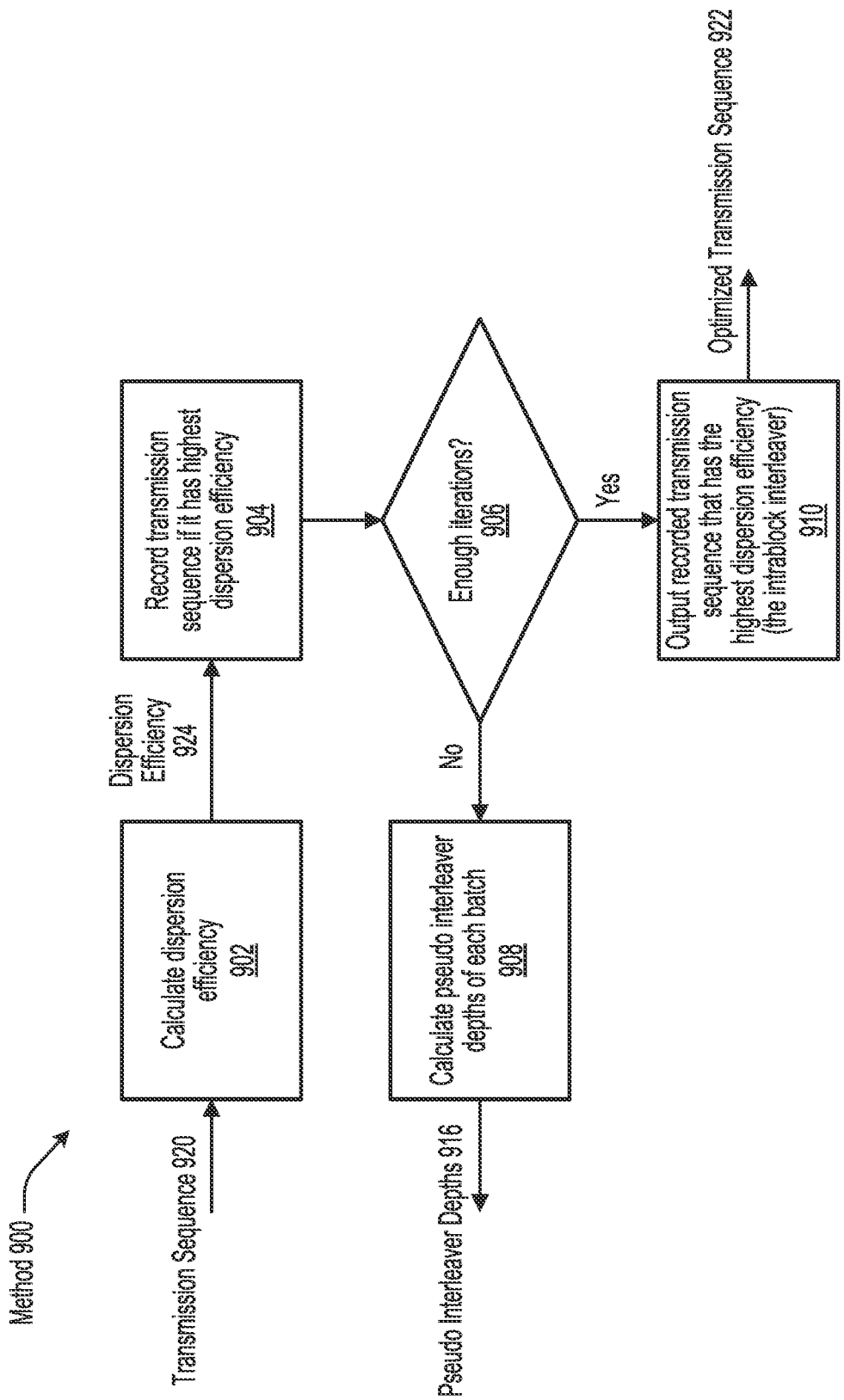
FIG. 9 illustrates an example method that may be performed by a decision maker.

FIG. 9 illustrates an example method that may be performed by a decision maker (e.g., decision maker 402), in accordance with some embodiment of the present disclosure. At step 902, a transmission sequence 920 is received from a packet separator and a dispersion efficiency 924 is calculated for transmission sequence 920. At step 904, transmission sequence 920 is recorded if dispersion efficiency 924 for transmission sequence 920 is the largest/highest dispersion efficiency of all received transmission sequences. At step 906, it is determined whether enough iterations have been performed. If it is determined that not enough iterations have been performed, method 900 proceeds to step 908, at which pseudo interleaver depths 916 are calculated for all batches (one for each batch). If it is determined that enough iterations have been performed, method 900 proceeds to step 910, at which the recorded transmission sequence that has the highest dispersion efficiency is outputted as an optimized transmission sequence 922.

Figure 10:
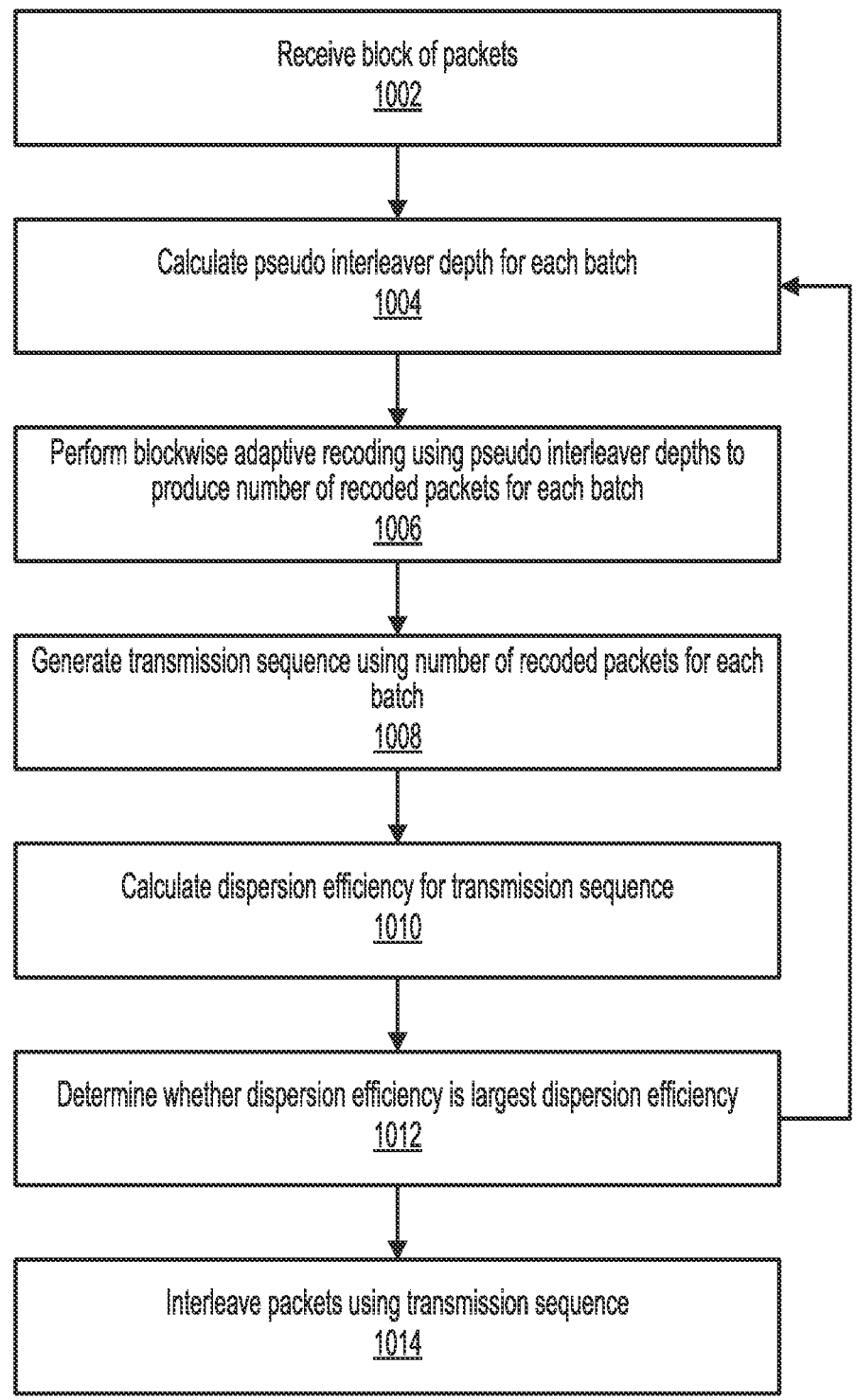
FIG. 10 illustrates a method for performing compatible packet separation for communication networks.

FIG. 10 illustrates a method 1000 for performing compatible packet separation for communication networks, in accordance with some embodiment of the present disclosure. One or more steps of method 1000 may be omitted during performance of method 1000, and steps of method 1000 may be performed in any order and/or in parallel. Method 1000 may be implemented as a computer-readable medium or computer program product comprising instructions which, when the program is executed by one or more computers, cause the one or more computers to carry out the steps of method 1000. Such computer program products can be transmitted, over a wired or wireless network, in a data carrier signal carrying the computer program product.

At step 1002, a block (e.g., block 210) comprising a plurality of packets (e.g., packets 108, 208) to be transmitted over a network (e.g., networks 100, 300) is received. In some embodiments, the block includes a set of batches (e.g., batches 212). In some embodiments, the plurality of packets are distributed between the set of batches. In some instances, each of the plurality of packets may include a batch identifier that identifies which of the set of batches the packet belongs to.

At step 1004, a pseudo interleaver depth (e.g., pseudo interleaver depths 416, 916) is calculated for each of the set of batches to produce a set of pseudo interleaver depths. In some embodiments, the pseudo interleaver depth for a particular batch of the set of batches may be calculated based on an average separation between consecutive packets of the particular batch. In some embodiments, step 1004 may be performed by a decision maker (e.g., decision maker 402).

At step 1006, blockwise adaptive recoding is performed using the set of pseudo interleaver depths to produce a number of recoded packets (e.g., number of recoded packets 418, 818) for each of the set of batches. In some embodiments, performing the blockwise adaptive recoding using the set of pseudo interleaver depths includes calculating a channel model for each of the set of batches. In some embodiments, performing the blockwise adaptive recoding using the set of pseudo interleaver depths further includes solving a blockwise adaptive recoding optimization problem using the channel model for each of the set of batches. In some embodiments, step 1006 may be performed by a blockwise adaptive recoder (e.g., blockwise adaptive recoder 404).

At step 1008, a transmission sequence (e.g., transmission sequences 420, 820, 920) is generated using the number of recoded packets for each of the set of batches. In some embodiments, step 1008 may be performed by a packet separator (e.g., packet separator 406).

At step 1010, a dispersion efficiency (e.g., dispersion efficiency 924) is calculated for the transmission sequence. In some embodiments, step 1010 may be performed by the decision maker.

At step 1012, it is determined whether the dispersion efficiency is a largest dispersion efficiency. In some embodiments, if it is determined that the dispersion efficiency is the largest dispersion efficiency, the transmission sequence is recorded and/or stored in a memory device. In some embodiments, step 1012 may include determining whether the dispersion efficiency is a maximum dispersion efficiency of all previously calculated dispersion efficiencies. In some embodiments, step 1012 may be performed by the decision maker. After step 1012, method 1000 may return to step 1004 to perform another iteration through steps 1004 to 1012, or method 1000 may proceed to step 1014.

At step 1014, the plurality of packets are interleaved using an optimized transmission sequence (e.g., optimized transmission sequences 422, 922), In some embodiments, the optimized transmission sequence may be the transmission sequence with the largest dispersion efficiency.

Figure 11:
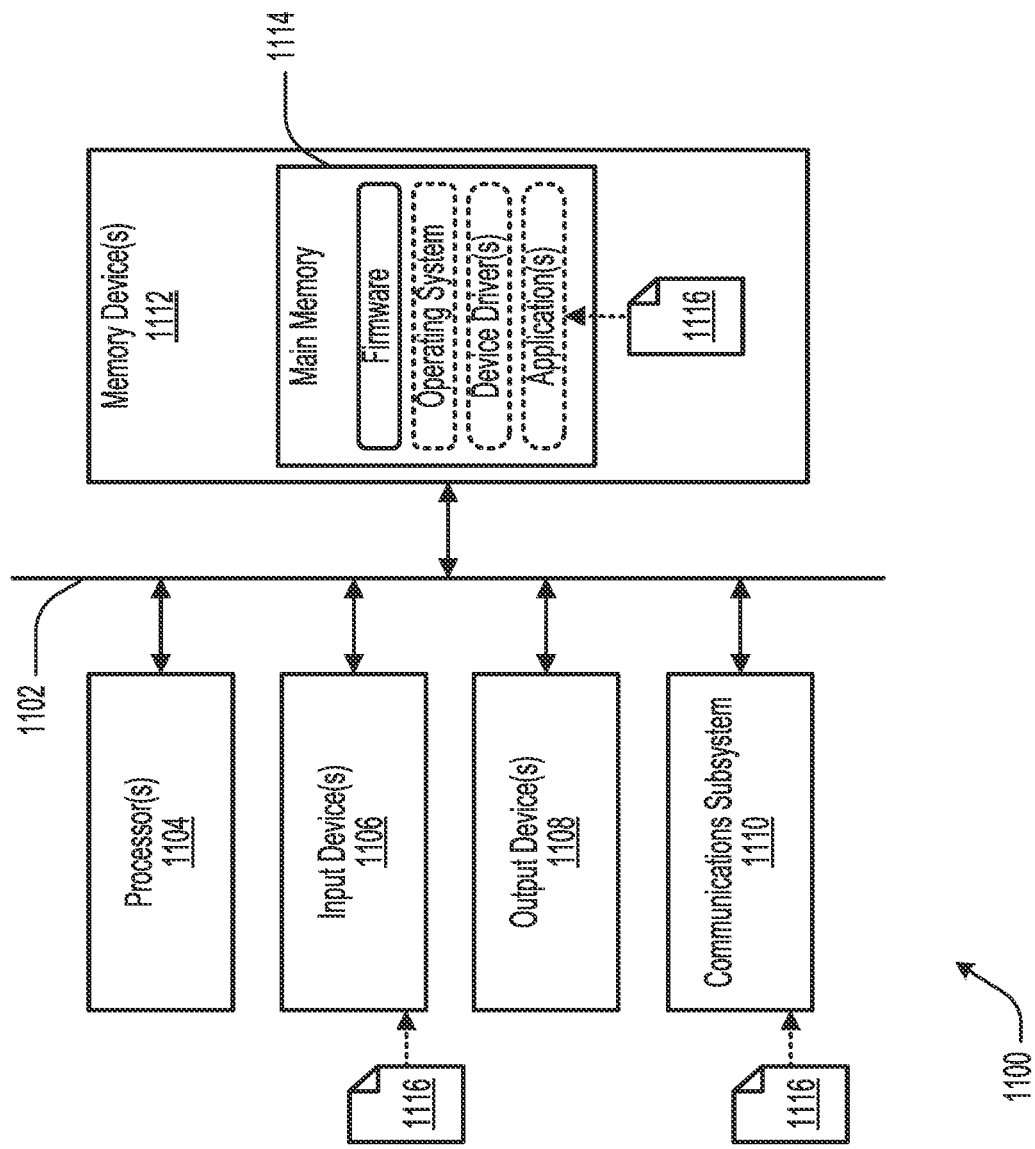
FIG. 11 illustrates an example computer system comprising various hardware elements.

FIG. 11 illustrates an example computer system 1100 comprising various hardware elements, according to some embodiments of the present disclosure. Computer system 1100 may be incorporated into or integrated with devices described herein and/or may be configured to perform some or all of the steps of the methods provided by various embodiments. For example, in various embodiments, computer system 1100 may be incorporated into system 400 and/or may be configured to perform method 900. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

In the illustrated example, computer system 1100 includes a communication medium 1102, one or more processor(s) 1104, one or more input device(s) 1106, one or more output device(s) 1108, a communications subsystem 1110, and one or more memory device(s) 1112. Computer system 1100 may be implemented using various hardware implementations and embedded system technologies. For example, one or more elements of computer system 1100 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1100 may be coupled via communication medium 1102. While communication medium 1102 is illustrated as a single connection for purposes of clarity, it should be understood that communication medium 1102 may include various numbers and types of communication media for transferring data between hardware elements. For example, communication medium 1102 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1102 may include one or more buses connecting pins of the hardware elements of computer system 1100. For example, communication medium 1102 may include a bus connecting processor(s) 1104 with main memory 1114, referred to as a system bus, and a bus connecting main memory 1114 with input device(s) 1106 or output device(s) 1108, referred to as an expansion bus. The system bus may consist of several elements, including an address bus, a data bus, and a control bus. The address bus may carry a memory address from processor(s) 1104 to the address bus circuitry associated with main memory 1114 in order for the data bus to access and carry the data contained at the memory address back to processor(s) 1104. The control bus may carry commands from processor(s) 1104 and return status signals from main memory 1114. Each bus may include multiple wires for carrying multiple bits of information and each bus may support serial or parallel transmission of data.

Processor(s) 1104 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1104 may include one or more multi-core processors, in which each core may read and execute program instructions simultaneously with the other cores.

Input device(s) 1106 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1106 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SDs), and/or the like.

Output device(s) 1108 may include one or more of various devices that convert information into human-readable form, such as without limitation a display device, a speaker, a printer, and/or the like. Output device(s) 1108 may also include devices for writing to removable storage devices or other removable media, such as those described in reference to input device(s) 1106. Output device(s) 1108 may also include various actuators for causing physical movement of one or more components. Such actuators may be hydraulic, pneumatic, electric, and may be provided with control signals by computer system 1100.

Communications subsystem 1110 may include hardware components for connecting computer system 1100 to systems or devices that are located external computer system 1100, such as over a computer network. In various embodiments, communications subsystem 1110 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1112 may include the various data storage devices of computer system 1100. For example, memory device(s) 1112 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 1104 and memory device(s) 1112 are illustrated as being separate elements, it should be understood that processor(s) 1104 may include varying levels of on-processor memory, such as processor registers and caches that may be utilized by a single processor or shared between multiple processors.

Memory device(s) 1112 may include main memory 1114, which may be directly accessible by processor(s) 1104 via the memory bus of communication medium 1102. For example, processor(s) 1104 may continuously read and execute instructions stored in main memory 1114. As such, various software elements may be loaded into main memory 1114 to be read and executed by processor(s) 1104 as illustrated in FIG. 11. Typically, main memory 1114 is volatile memory, which loses all data when power is turned off and accordingly needs power to preserve stored data. Main memory 1114 may further include a small portion of non-volatile memory containing software (e.g., firmware, such as BIOS) that is used for reading other software stored in memory device(s) 1112 into main memory 1114. In some embodiments, the volatile memory of main memory 1114 is implemented as random-access memory (RAM), such as dynamic RAM (DRAM), and the non-volatile memory of main memory 1114 is implemented as read-only memory (ROM), such as flash memory, erasable programmable read-only memory (EPROM), or electrically erasable programmable read-only memory (EEPROM).

Computer system 1100 may include software elements, shown as being currently located within main memory 1114, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1116, executable by computer system 1100. In one example, such instructions 1116 may be received by computer system 1100 using communications subsystem 1110 (e.g., via a wireless or wired signal carrying instructions 1116), carried by communication medium 1102 to memory device(s) 1112, stored within memory device(s) 1112, read into main memory 1114, and executed by processor(s) 1104 to perform one or more steps of the described methods. In another example, instructions 1116 may be received by computer system 1100 using input device(s) 1106 (e.g., via a reader for removable media), carried by communication medium 1102 to memory device(s) 1112, stored within memory device(s) 1112, read into main memory 1114, and executed by processor(s) 1104 to perform one or more steps of the described methods, In some embodiments of the present disclosure, instructions 1116 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1100. For example, the non-transitory computer-readable medium may be one of memory device(s) 1112, as shown in FIG. 11, with instructions 1116 being stored within memory device(s) 1112. In some cases, the non-transitory computer-readable medium may be separate from computer system 1100. In one example, the non-transitory computer-readable medium may be a removable media provided to input device(s) 1106, such as those described in reference to input device(s) 1106, as shown in FIG. 11, with instructions 1116 being provided to input device(s) 1106. In another example, the non-transitory computer-readable medium may be a component of a remote electronic device, such as a mobile phone, that may wirelessly transmit a data signal carrying instructions 1116 to computer system 1100 using communications subsystem 1116, as shown in FIG. 11, with instructions 1116 being provided to communications subsystem 1110.

Instructions 1116 may take any suitable form to be read and/or executed by computer system 1100, For example, instructions 1116 may be source code (written in a human-readable programming language such as Java, C, C++, C#, Python), object code, assembly language, machine code, microcode, executable code, and/or the like. In one example, instructions 1116 are provided to computer system 1100 in the form of source code, and a compiler is used to translate instructions 1116 from source code to machine code, which may then be read into main memory 1114 for execution by processor(s) 1104. As another example, instructions 1116 are provided to computer system 1100 in the form of an executable file with machine code that may immediately be read into main memory 1114 for execution by processor(s) 1104. In various examples, instructions 1116 may be provided to computer system 1100 in encrypted or unencrypted form, compressed or uncompressed form, as an installation package or an initialization for a broader software deployment, among other possibilities.

In one aspect of the present disclosure, a system (e.g., computer system 1100) is provided to perform methods in accordance with various embodiments of the present disclosure. For example, some embodiments may include a system comprising one or more processors (e.g., processor(s) 1104) that are communicatively coupled to a non-transitory computer-readable medium (e.g., memory device(s) 1112 or main memory 1114). The non-transitory computer-readable medium may have instructions (e.g., instructions 1116) stored therein that, when executed by the one or more processors, cause the one or more processors to perform the methods described in the various embodiments.

In another aspect of the present disclosure, a computer-program product that includes instructions (e.g., instructions 1116) is provided to perform methods in accordance with various embodiments of the present disclosure. The computer-program product may be tangibly embodied in a non-transitory computer-readable medium (e.g., memory device(s) 1112 or main memory 1114). The instructions may be configured to cause one or more processors (e.g., processor(s) 1104) to perform the methods described in the various embodiments.

In another aspect of the present disclosure, a non-transitory computer-readable medium (e.g., memory device(s) 1112 or main memory 1114) is provided. The non-transitory computer-readable medium may have instructions (e.g., instructions 1116) stored therein that, when executed by one or more processors (e.g., processor(s) 1104), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
   receiving a block comprising a plurality of packets to be transmitted over a network, wherein the block includes a set of batches, and wherein the plurality of packets are distributed between the set of batches;
   calculating a pseudo interleaver depth for each of the set of batches to produce a set of pseudo interleaver depths;
   performing blockwise adaptive recoding using the set of pseudo interleaver depths to produce a number of recoded packets for each of the set of batches; and
   generating a transmission sequence using the number of recoded packets for each of the set of batches.

2. The computer-implemented method of claim 1, further comprising:
   interleaving the plurality of packets using the transmission sequence.

3. The computer-implemented method of claim 1, further comprising:
   outputting the transmission sequence.

4. The computer-implemented method of claim 1, further comprising:
   calculating a dispersion efficiency for the transmission sequence; and
   determining whether the dispersion efficiency is a largest dispersion efficiency.

5. The computer-implemented method of claim 1, wherein performing the blockwise adaptive recoding using the set of pseudo interleaver depths includes:
   calculating a channel model for each of the set of batches.

6. The computer-implemented method of claim 5, wherein performing the blockwise adaptive recoding using the set of pseudo interleaver depths further includes:
   solving a blockwise adaptive recoding optimization problem using the channel model for each of the set of batches.

7. The computer-implemented method of claim 1, wherein the pseudo interleaver depth for a particular batch of the set of batches is calculated based on an average separation between consecutive packets of the particular batch.

8. A non-transitory computer-readable medium comprising instructions that, when executed by one or more processors, cause the one or more processors to perform operations comprising:
   receiving a block comprising a plurality of packets to be transmitted over a network, wherein the block includes a set of batches, and wherein the plurality of packets are distributed between the set of batches;
   calculating a pseudo interleaver depth for each of the set of batches to produce a set of pseudo interleaver depths;
   performing blockwise adaptive recoding using the set of pseudo interleaver depths to produce a number of recoiled packets for each of the set of batches; and
   generating a transmission sequence using the number of recoded packets for each of the set of batches.

9. The non-transitory computer-readable medium of claim 8, wherein the operations further comprise:
   interleaving the plurality of packets using the transmission sequence.

10. The non-transitory computer-readable medium of claim 8, wherein the operations further comprise:
    outputting the transmission sequence.

11. The non-transitory computer-readable medium of claim 8, wherein the operations further comprise:
    calculating a dispersion efficiency for the transmission sequence; and
    determining whether the dispersion efficiency is a largest dispersion efficiency.

12. The non-transitory computer-readable medium of claim 8, wherein performing the blockwise adaptive recoding using the set of pseudo interleaver depths includes:
    calculating a channel model for each of the set of batches.

13. The non-transitory computer-readable medium of claim 12, wherein performing the blockwise adaptive recoding using the set of pseudo interleaver depths further includes:
    solving a blockwise adaptive recoding optimization problem using the channel model for each of the set of batches.

14. The non-transitory computer-readable medium of claim 8, wherein the pseudo interleaver depth for a particular batch of the set of batches is calculated based on an average separation between consecutive packets of the particular batch.

15. A system comprising:
    one or more processors; and
    a computer-readable medium comprising instructions that, when executed by the one or more processors, cause the one or more processors to perform operations comprising:
    receiving a block comprising a plurality of packets to be transmitted over a network, wherein the block includes a set of batches, and wherein the plurality of packets are distributed between the set of batches;
    calculating a pseudo interleaver depth for each of the set of batches to produce a set of pseudo interleaver depths;
    performing blockwise adaptive recoding using the set of pseudo interleaver depths to produce a number of recoded packets for each of the set of batches; and
    generating a transmission sequence using the number of recoded packets for each of the set of batches.

16. The system of claim 15, wherein the operations further comprise:
    interleaving the plurality of packets using the transmission sequence.

17. The system of claim 15, wherein the operations further comprise:
    outputting the transmission sequence.

18. The system of claim 15, wherein the operations further comprise:
    calculating a dispersion efficiency for the transmission sequence; and
    determining whether the dispersion efficiency is a largest dispersion efficiency.

19. The system of claim 15, wherein performing the blockwise adaptive recoding using the set of pseudo interleaver depths includes:
    calculating a channel model for each of the set of batches.

20. The system of claim 19, wherein performing the blockwise adaptive recoding using the set of pseudo interleaver depths further includes:

solving a blockwise adaptive recoding optimization problem using the channel model for each of the set of batches.

\* \* \* \* \*